US 6,725,754 B2

(12) United States Patent
MacKenzie

(10) Patent No.: US 6,725,754 B2
(45) Date of Patent: Apr. 27, 2004

(54) WORKPIECE POSITIONING DEVICE

(76) Inventor: George L. MacKenzie, 884 Temple St., Duxbury, MA (US) 02332-2929

( * ) Notice: Subject to any disclaimer, the term of this patent is extended or adjusted under 35 U.S.C. 154(b) by 374 days.

(21) Appl. No.: 09/961,610

(22) Filed: Sep. 24, 2001

(65) Prior Publication Data

US 2002/0014143 A1 Feb. 7, 2002

Related U.S. Application Data

(63) Continuation-in-part of application No. 09/553,293, filed on Apr. 20, 2000, now Pat. No. 6,293,177.

(51) Int. Cl.$^7$ ................................................. B26D 7/02
(52) U.S. Cl. .................. 83/467.1; 83/522.19; 83/468.7; 269/303
(58) Field of Search ........................... 83/467.1, 522.19, 83/468.7, 468, 468.2; 269/303, 304, 315; 33/484, 485–487, 809, 613

(56) References Cited

U.S. PATENT DOCUMENTS

| 4,137,643 A | * | 2/1979 | Carmel | 33/613 |
| 4,336,655 A | * | 6/1982 | Thingstad | 33/809 |
| 4,662,077 A | * | 5/1987 | Richardson | 33/296 |
| 4,693,158 A | * | 9/1987 | Price | 83/468 |
| 5,018,562 A | * | 5/1991 | Adams | 144/253.1 |
| 5,337,641 A | * | 8/1994 | Duginske | 83/468 |
| 5,642,569 A | * | 7/1997 | Palmer | 33/809 |
| 5,768,966 A | * | 6/1998 | Duginske | 83/468.7 |

\* cited by examiner

Primary Examiner—Kenneth E. Peterson
Assistant Examiner—Omar Flores-Sánchez
(74) Attorney, Agent, or Firm—Lambert & Associates; Gary E. Lambert

(57) ABSTRACT

A workpiece positioning device for precisely positioning a workpiece relative to a power tool or other device. The device includes a stationary base, an elongated locator member carried by the base for limited slideable movement right and left thereof. The locator member having a set of spaced-apart circumferential slots therein. An elongated scale made fast to the base and disposed adjacent to the locator member has a set of axially aligned spaced-apart through-apertures therein for positioning of the scale relative to said locator member. A movable stop having a surface thereon for abutting against a workpiece is disposed adjacent to the locator member for limited slideable movement right and left thereof. The movable stop being incrementally positionable relative to the locator member. The locator member being incrementally positionable relative to the scale. Whereby a workpiece abutting the movable stop will be exactly located in the precise position selected therefor.

15 Claims, 8 Drawing Sheets

WORKPIECE POSITIONING DEVICE

CROSS REFERENCE TO RELATED APPLICATIONS

This application claims the benefit in the form of a continuation-in-part under 37 CFR 1.53(b)(1) of currently pending parent application, Ser. No. 09/553,293 filed Apr. 20, 2000, now U.S. Pat. No. 6,293,177, by the same inventor, said application being incorporated herein by reference.

FIELD OF THE INVENTION

The present invention relates to equipment designed to position a workpiece accurately in a predetermined position relative to a reference point, and more particularly to a workpiece positioning device for precisely positioning a workpiece relative to a power tool or other device quickly and efficiently. The present invention workpiece positioning device is very dependable, economical to produce and adaptable to a wide variety of machines and power tools.

BACKGROUND

When using a machine designed to alter or cut a material such as wood, metal, plastic, or other matter, it is usually necessary to position the workpiece accurately relative to the cutting tool to ensure the proper dimensions of the workpiece after the machining process. The procedure of positioning a workpiece relative to a cutting tool is often a repetitive procedure which is a critical step in the manufacturing process. The quality of the work product can depend heavily on the accuracy of the positioning of the workpiece. A dependable method of accurately positioning the workpiece prior to a cutting procedure minimizes the waste of incorrectly cut stock.

In many situations when using a cutting tool it is necessary to make numerous cuts of different dimensions requiring the operator to reset a positioning device or movable stop relative to the cutting tool many times, in other situations, pieces of the same size may be needed at different times requiring the user to accurately reset a positioning device repetitively to the same position. A mechanical positioning device is proven to be a useful to accurately position a workpiece relative to a cutting tool and can be used with a wide variety of machines and power tools.

There are many mechanical positioning devices presently available having the ability to accurately position a workpiece relative to a power tool. However, many of the positioning devices available with highly accurate positioning capabilities, accurate to $\frac{1}{1000}$th of an inch, are complex and expensive devices which are not easily adaptable to a variety of machines and power tools.

Less expensive mechanical positioning devices available are far less accurate in positioning capabilities and rely heavily on both the experience and the eyesight of the user. Many of these devices utilize a lead screw.

The present invention workpiece positioning device provides a highly accurate mechanical positioning device which can be incrementally positioned in increments as small as $\frac{1}{1000}$th of an inch relative to a reference point. This device can be precisely positioned incrementally in seconds by an ordinary user and does not require years of experience or exceptional eyesight to accurately position a workpiece for cutting or other procedures. The present invention is accurate, dependable and economical to manufacture. The preferred embodiment of the present invention is constructed of durable materials which will not wear out or break easily. The design of the present invention is simple in comparison to other devices which provide the same level of precision and accuracy in that there are not a lot of complex or expensive moving parts which add to the cost of other positioning devices and which have a higher risk of being damaged or broken. One embodiment of the present invention is a portable design wherein the workpiece positioning device can easily be transferred from one machine to another for efficiency of use in small shops.

SUMMARY OF THE INVENTION

The present invention provides a workpiece positioning device for precisely positioning a workpiece in a predetermined position relative to a power tool or other device quickly and efficiently. This device provides a simple and dependable apparatus for quickly and easily positioning a workpiece incrementally in increments as small as 0.0010 inches.

The present invention device disclosed is for positioning a workpiece to be worked upon by a power tool. The workpiece positioning device disclosed includes a stationary base, an elongated locator member carried by the base for limited slideable movement right and left thereof, the locator member having a plurality of spaced-apart circumferential slots therein. The present invention device has an elongated scale made fast to the base and disposed adjacent to the locator member. The invention further comprises a set of axially aligned spaced-apart through-apertures in the scale having a diameter equal to the width of the circumferential slots in the locator member.

The present invention device includes a movable stop having a surface thereon for abutting against a workpiece, the movable stop being disposed adjacent to the locator member for limited slideable movement right and left thereof. The movable stop having a set of axially aligned spaced-apart through-apertures therein. The movable stop being incrementally positionable relative to the locator member by alignment of one of the apertures therein with one of the circumferential slots in the locator member. The spacing of the apertures in the movable stop and the spacing of the circumferential slots in the locator member being different from each other by an amount equal to a first precise predetermined distance to offset positioning of the movable stop relative to the locator member. The preferred embodiment has a locator member having a circular cross-section, however other shapes for the locator member could be used as well.

The locator member being incrementally positionable relative to the scale by alignment of one of the apertures in the scale with one of the circumferential slots in the locator member. The spacing of the apertures in the scale and the spacing of the slots in the locator member being different from each other by an amount equal to a second precise predetermined distance to facilitate precision positioning of the locator member relative to the scale.

The second precise predetermined distance being more precise than the first precise predetermined distance, whereby a workpiece abutting the movable stop will be exactly located in the precise position selected therefor.

The present invention, in the preferred embodiment provides a workpiece positioning device for precisely positioning a workpiece to be worked on by a tool comprises a stationary base having a cavity therein, an elongated locator member disposed in the cavity for limited slideable movement right and left of the base, the locator member having a set of spaced apart circumferential slots therein. An elongated scale is made fast to the base and disposed adjacent to the locator member. In the preferred embodiment, the scale is made integral to the base. The invention further comprises a set of axially aligned spaced-apart vertical through-apertures in the scale equal in diameter to the width of the slots in the locator member, and equal in number to the number of slots in the locator member. A movable stop is provided having a surface thereon for abutting against a workpiece, an interior surface of the movable stop having a cavity therein, for receiving a portion of the locator member for limited slideable movement of the movable stop right and left of the locator member. The invention further comprises a set of axially aligned spaced-apart horizontal through-apertures in the movable stop. The movable stop being incrementally positionable relative to the locator member by alignment of one of the apertures therein with one of the apertures in the locator member. The invention includes a first pin means extendable through the movable stop and into one of the slots in the locator member for fixing whichever position of the movable stop is selected, wherein the spacing of the apertures in the movable stop and the slots in the locator member being different from each other by an amount equal to a first precise predetermined distance to facilitate fine positioning of the movable stop relative to the locator member. In one embodiment, the first pin means includes a pin having a shank equal to the diameter of the apertures in the movable stop and an end equal to the width of the slots in the locator member, thus the apertures in the movable stop and the width of the slots in the locator member can be different and yet precisely aligned easily with the first pin means. The pin can include a semi-circular shaped end, or other shape, to conform to the circumference of the locator member. The locator member being incrementally positionable relative to the scale by alignment of one of the apertures in the scale with the slots in the locator member, wherein a second pin means extendable through the scale and into one of the slots for fixing whichever position of the locator member is selected. The spacing of the apertures in the scale and the slots in the locator member being different from each other by an amount equal to a second precise predetermined distance to facilitate precision positioning of the locator member relative to the scale. The second precise predetermined distance being more precise than the first precise predetermined distance, whereby a workpiece abutting the movable stop will be exactly located in the precise position desired therefor.

In another aspect of the invention a workpiece positioning device is provided wherein the fine positioning of the movable stop relative to the locator member is effected by incremental movements of 1/16th of an inch each.

Another aspect of the invention provides a workpiece positioning device wherein the precision positioning of the locator member relative to the scale is effected by incremental movements of 1/1000th of an inch each.

The invention also provides a workpiece positioning device wherein the fine positioning of the movable stop relative to the locator member is effected by incremental movements of 1/16th of an inch each, and wherein the precision positioning of the locator member relative to the scale is effected by incremental movements of 1/1000th of an inch each.

Another aspect of the invention comprises a ruler affixed to the scale for facilitating the positioning of the movable stop relative to the locator member.

The invention further comprises other aspects wherein the movable stop has opposite surfaces for alternately abutting against a workpiece and a removably attachable pivotable flip stop postionable for operation adjacent to either of the opposite surfaces. The invention further comprises removably attachable means associated with the movable stop and extending laterally the surface thereof which abuts the workpiece.

Still another aspect of the invention further comprises an extension members removably attachable to an end of the base and the locator member for extending the lengths thereof, the extension member for the locator member having a set of axially aligned spaced-apart circumferential slots therein identical to the set of circumferential slots in said locator member, wherein the movable stop being slideable right and left of the extension member.

Another aspect of the invention comprises a mounting means on the lower surface of the base for mounting the base to a power tool. The mounting means can provide for slideable movement of the base relative to a cutting tool.

The present invention further comprises a workpiece positioning device wherein the apertures in the movable stop are sequentially numbered to facilitate fine positioning thereof relative to the locator member and wherein the apertures in the scale are sequentially numbered to facilitate precise positioning of the locator member thereto.

DETAILED DESCRIPTION OF THE PREFERRED EMBODIMENTS

Detailed preferred embodiments of the present invention are disclosed. It is to be understood, however, that the disclosed embodiments are merely exemplary of the invention, which may be embodied in various forms. Therefore, specific structural and functional details disclosed are not to be interpreted as limiting, but rather as a representative basis for teaching one skilled in the art to variously employ the present invention in virtually any appropriately detailed system or structure. The physical size of the invention can be augmented in order to increase durability. It will be understood that the drawings are not necessarily to scale, and relative component sizes may be exaggerated to facilitate an understanding of the invention.

The present invention relates to equipment designed to a workpiece positioning device for precisely positioning a workpiece relative to a power tool or other device quickly and efficiently. This device can be used with a wide variety of tools and machines in various applications.

Figure 1:
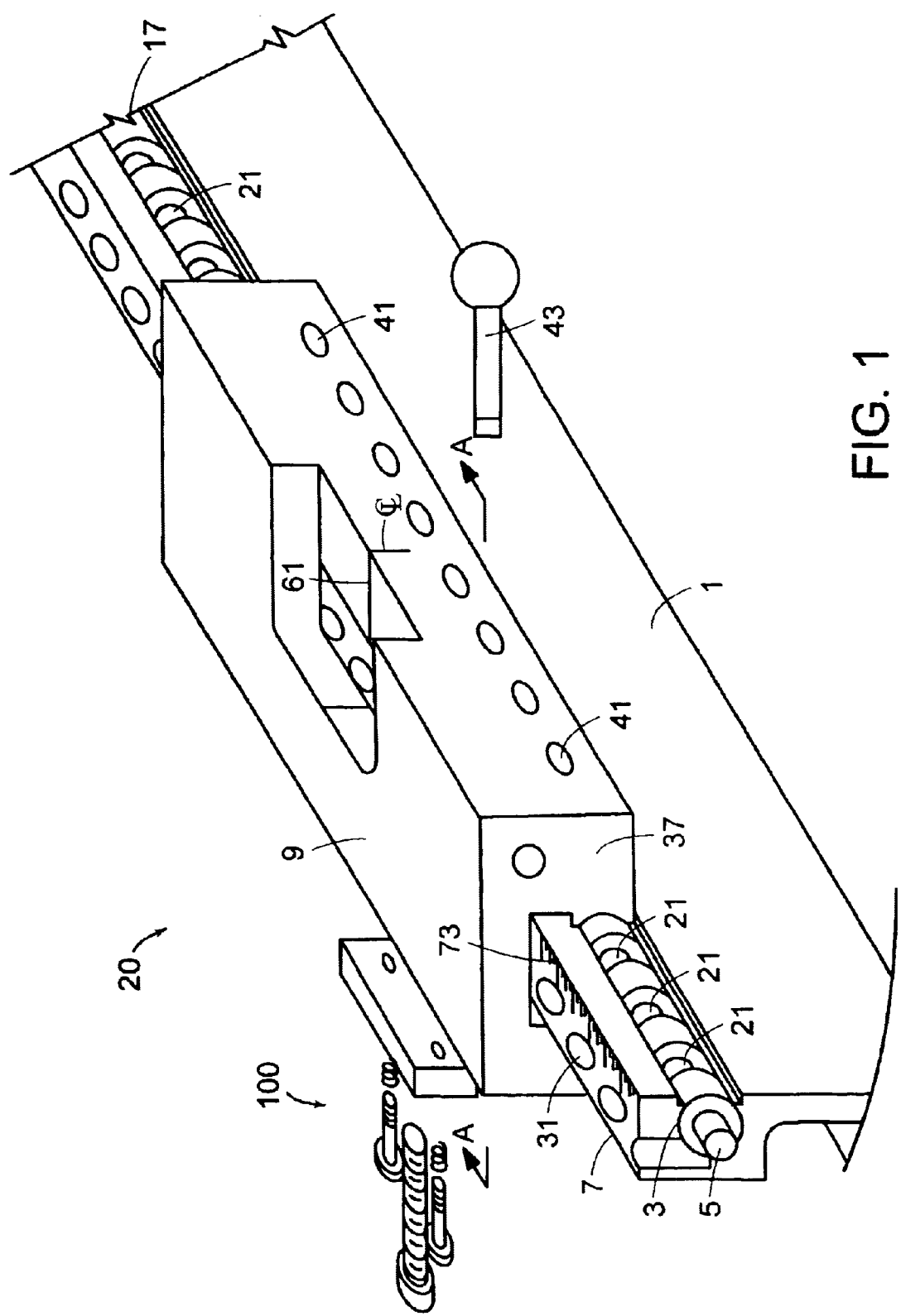
FIG. 1 is a perspective view of an embodiment of the workpiece positioning device of the present invention.
Figure 4:
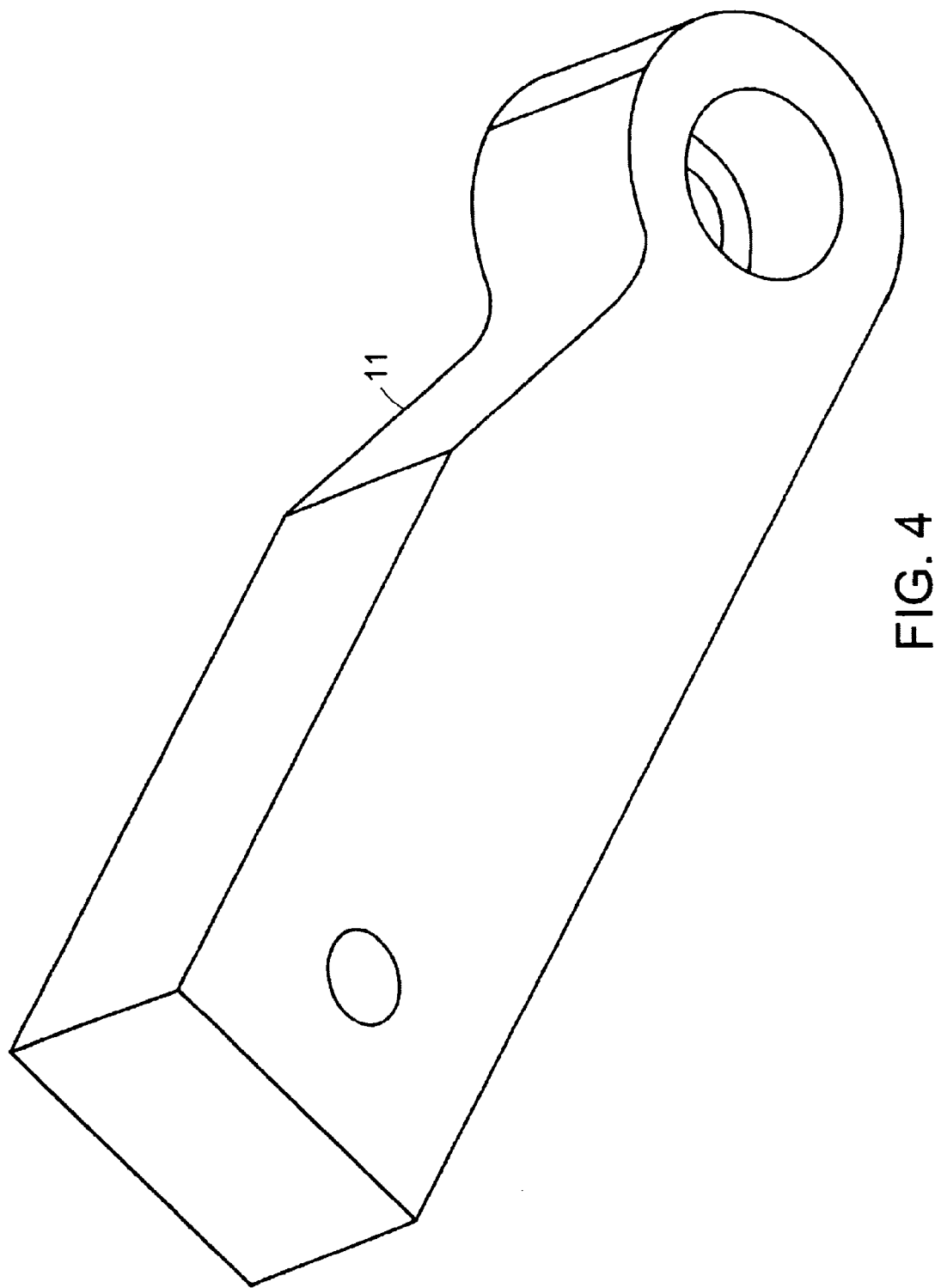
FIG. 4 is a perspective view of a flip-stop for use with a movable stop.
Figure 6:
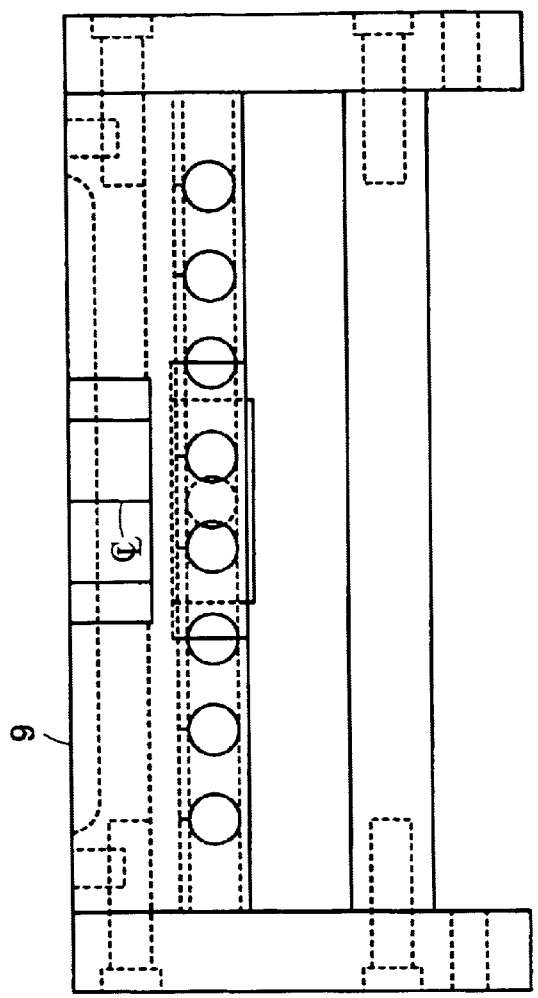
FIG. 6 shows front and end views of the movable stop as used in the FIG. 1 embodiment.
Figure 6:
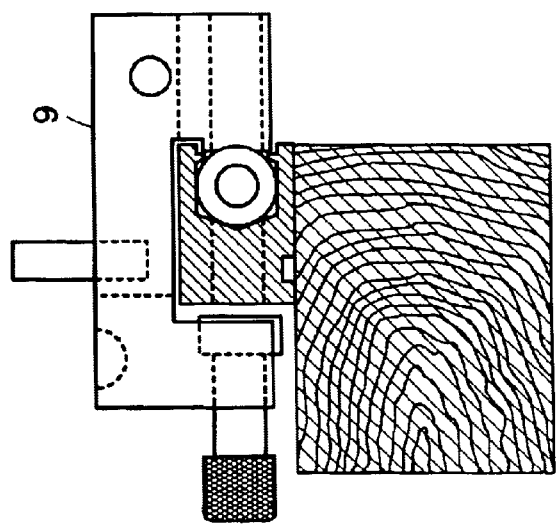

Referring to the drawings, wherein like numerals represent like parts throughout the several views, the preferred embodiment of the workpiece positioning device of the present invention, generally 20 in FIG. 1 comprises a stationary base 1, an elongated locator member 5, carried by base 1, is slideable left and right of base 1. An elongated scale 7, made fast to base 1, is positioned above and adjacent to locator member 5. A movable stop 9 (also depicted in FIG. 6) disposed adjacent to the locator member 5 is slideable left and right of thereof. A workpiece abutting the movable stop 9 can be precisely positioned in a predetermined position by selectively fine positioning the movable stop 9 relative to the locator member 5, and selective precision positioning of the locator member 5 relative to the scale 7. A flip stop 11 is shown in FIG. 4. Flip stop 11 is attachable to movable stop 9 for abutting the workpiece in some applications of the workpiece positioning device 20.

Following, each of the components of the workpiece positioning device will be discussed in detail.

Figure 2:
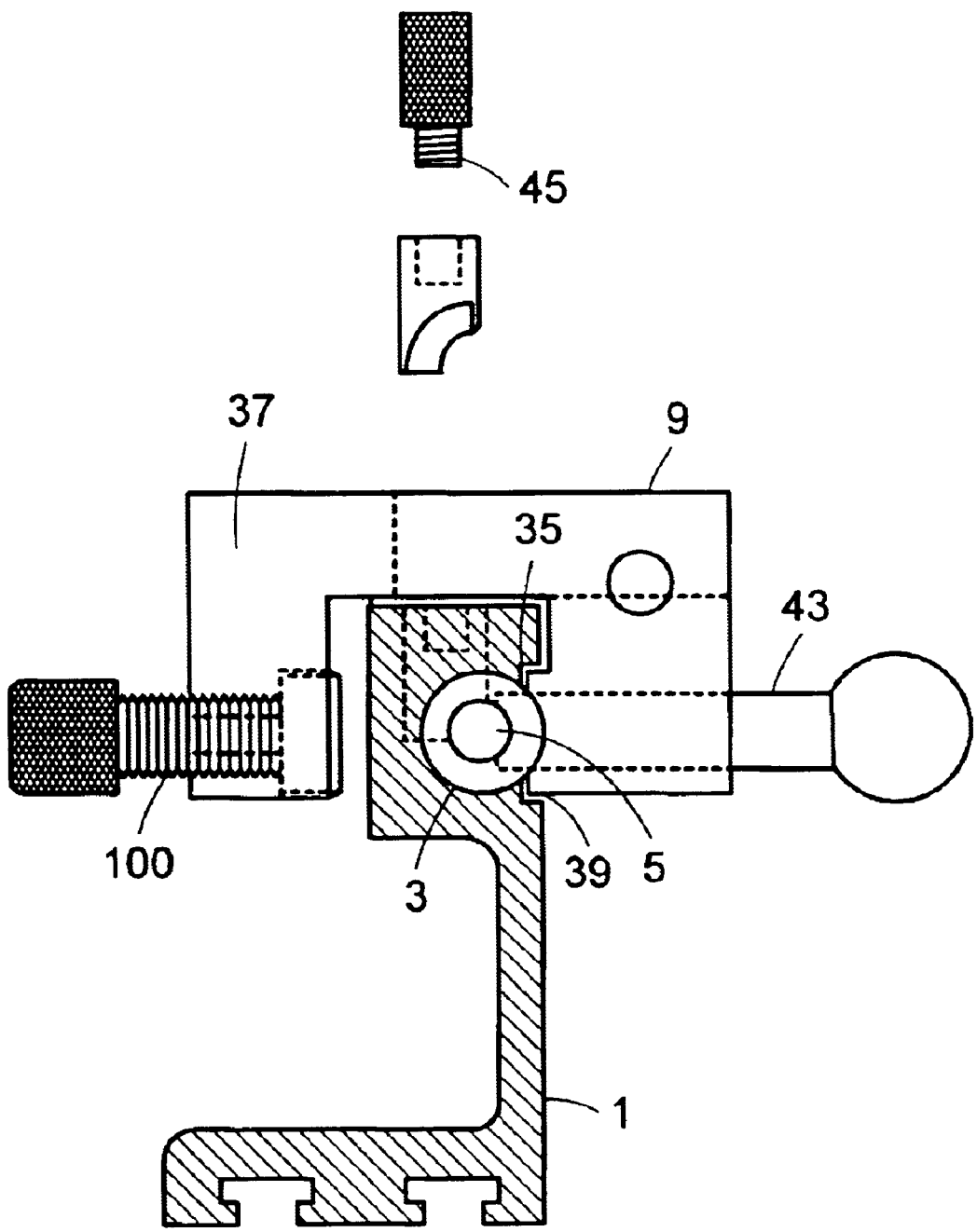
FIG. 2 is a cross-sectional view of the workpiece positioning device taken at line A—A on FIG. 1.
Figure 3:
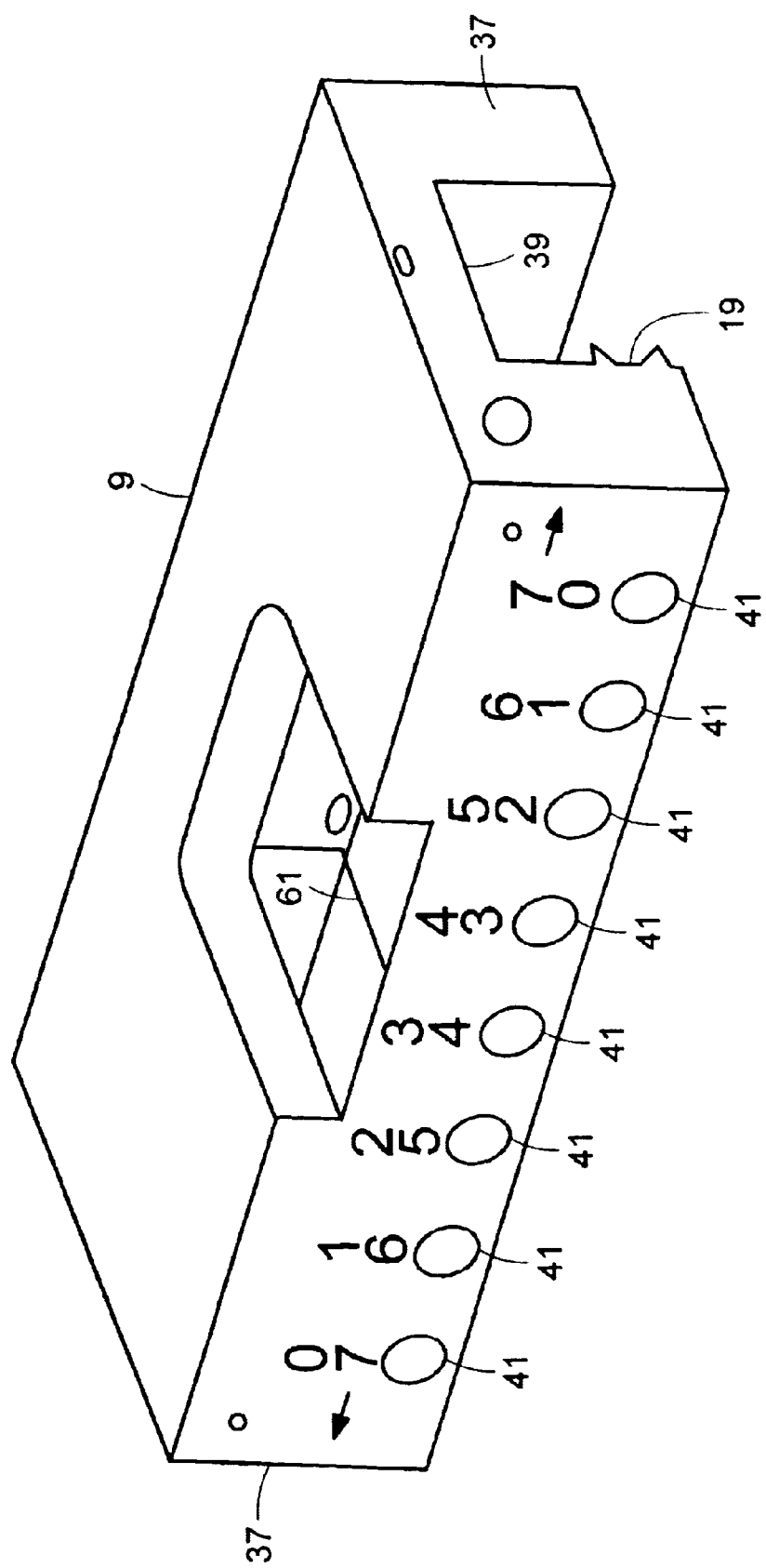
FIG. 3 is a perspective view of the movable stop as used in the FIG. 1 embodiment.

Referring again to FIG. 1 base 1 is stationary relative to the power tool or reference point for which the positioning device is being used. Tracks 42 on base 1 can be used to secure or position base 1 relative to a power tool. An elongated locator member 5 is disposed in cavity 3 of base 1. In the preferred embodiment, as shown in FIG. 2, locator member 5 has a round cross-section. The locator member has a set of spaced-apart circumferential slots 21 therein. The spacing depends on the length of the locator member 5. An elongated scale 7, shown in FIG. 1 is positioned above the locator member 5 and attached to base 1. In the preferred embodiment, scale 7 is integral to base 1. As shown in FIG. 3, groove 19 on an inner surface of movable stop 9 receives the locator member 5. Locator member 5 positioned in cavity 3 of the base 1 and adjacent scale 7 is limited to slideable movement left and right relative to base 1 and scale 7 by cavity 3 in base 1.

Figure 8:
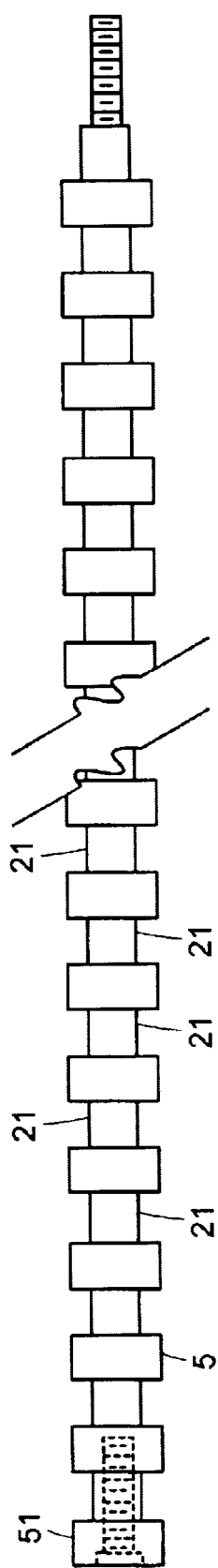
FIG. 8 shows a side view of the locator member.

A set of axially aligned spaced-apart vertical through-apertures, 31 in scale 7 are in alignment perpendicular to the slideable movement of locator member 5 with the set of circumferential slots 21 in locator member 5. A detailed drawing of locator member 5 is shown in FIG. 8. The set of axially aligned spaced-apart through apertures 31 in the scale 7 are equal in number to the number of apertures in scale 7 and are ¼ inch slots 21 in locator member 5.

Figure 7:
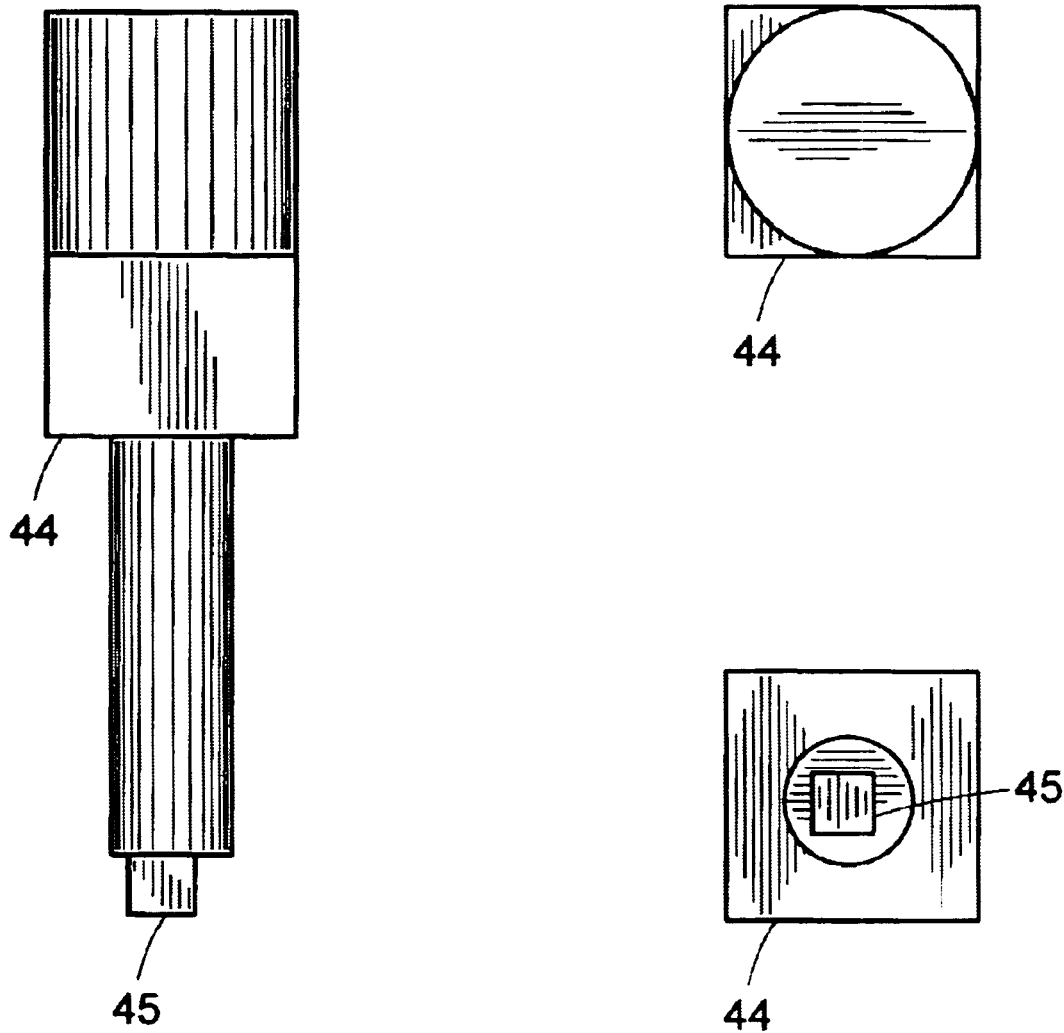
FIG. 7 shows side, front and back views respectively of a rotatable alignment pin for use with the present invention.

In another embodiment, as depicted in FIG. 7, a rotatable alignment pin 44 is employed. The rotatable alignment pin 44 is comprised of a cylindrical insertion area, possessing a raised cubic surface 45 protruding from the insertion face of the rotatable alignment pin 44. Upon insertion of the rotatable alignment pin 44 into an individual slot of the locator, the design of the rotatable alignment pin 44 allows the user to index the mechanism in increments of 1/64 of an inch. The rotatable alignment pin 44 is designed to allow four adjustments from each individual slot. The locator member is indexed 1/64 of an inch each quarter rotation of the rotatable alignment mechanism. Thus, the size of the locator and inherently the size of the overall mechanism may be decreased to ¼ the normal size.

The rotatable alignment pin 44 may possess markings in order to allow the user to be informed of the current position of rotation of the rotatable alignment pin 44. A 0 may be used for the initial marking and hash marks for the corresponding next three positions.

Movable stop 9, as shown in FIG. 3 has surfaces 37 for abutting against a workpiece on either the left or right end thereof. FIG. 3 shows protrusion 39 on the rear surface of movable stop 9 disposed in cavity 35 of base 1 which provides limited slideable movement left and right of the movable stop 9 relative to the locator member 5. A set of axially aligned spaced-apart horizontal through-apertures 41 in the front surface of the movable stop 9 are for positioning movable stop 9 with respect to locator member 5. Vertical alignment between the set of apertures 41 in the movable stop 9 and the set of slots 21 in locator member 5 is maintained by the protrusion 39 on the rear surface of the movable stop 9 being disposed in cavity 35 on base 1.

Figure 5:
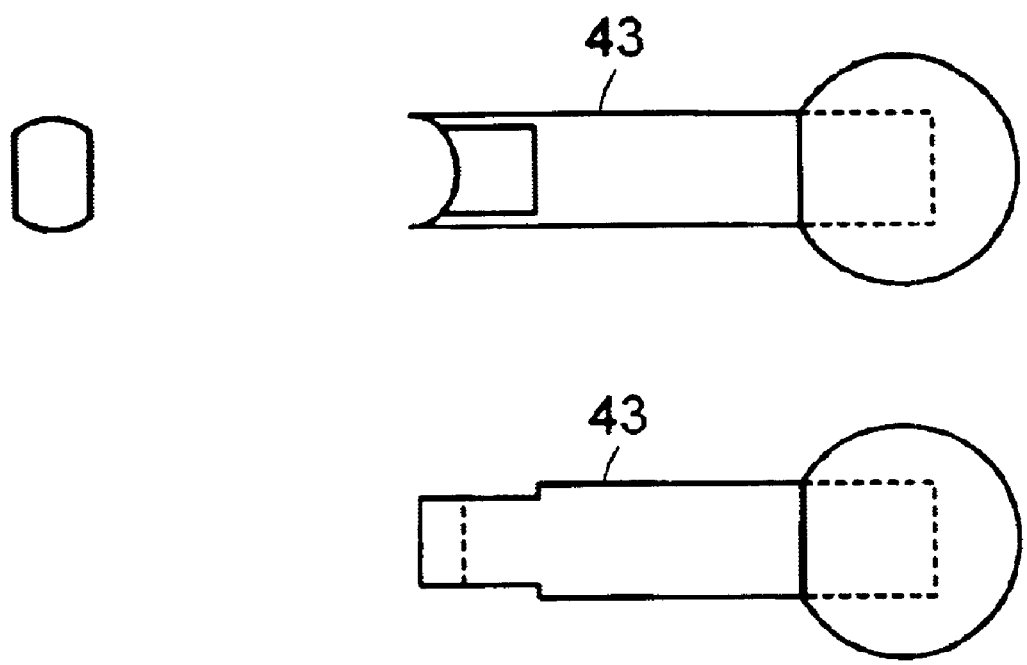
FIG. 5 shows side and top views respectively of an alignment pin for use with the present invention.

The movable stop 9 is incrementally positionable relative to the locator member 5 by aligning manually one of the apertures 41 in the movable stop 9 with one of the slots 21 in the locator member 5. A first pin 43 (also depicted separately in FIG. 5) placed through the selected aperture of the apertures 41 in the movable stop 9 and into one of the slots 21 of the locator member 5 fixes the selected position of the movable stop 9 relative to the locator member 5.

The spacing of the apertures 41 in the movable stop 9 and the slots 21 in the locator member 5 being different from each other by an amount equal to a first precise predetermined distance to facilitate fine positioning of the movable stop 9 relative to the locator member 5.

In the preferred embodiment the spacing of the apertures 41 in the movable stop 9 are 0.5625 inches and the spacing of the slots in the locator member are 0.5 inches. Fine positioning of the movable stop 9 relative to the locator member 5 can be incrementally adjusted in the preferred embodiment in increments equal to the difference in the spacing of the apertures 41 in the movable stop 9 and the slots 21 in the front portion 51 of the locator member 5 which is equal to (0.5625–0.5) inches or 0.0625 inches. Thus, in the preferred embodiment, fine positioning of the movable stop 9 relative to the locator member 5 is effected by incremental movements of 1/16-th of an inch each.

In the preferred embodiment as shown in FIG. 3, apertures 41 in the movable stop are numbered sequentially from 0–7 to facilitate fine positioning of the movable stop 9 relative to the locator member 5 in a left or right motion equal to the number of the aperture selected in the set of apertures in the movable stop 9 times the predetermined increment (0.0625 inches in the preferred embodiment). Scribe mark 61 designates the center of movable stop 9 and is positioned to align with ruler 73 affixed to the scale 7 and end caps 29 to enable the user to quickly position the movable stop relative to locator member 5 and the power tool or other device.

The locator member 5 is incrementally positionable relative to scale 7 by aligning one of the slots 21 in the locator member 5 with a selected one of the apertures 31 in the scale 7.

The spacing of the apertures 31 in the scale 7 and the slots 21 in the rear portion 17 of the locator member 5 being different from each other by an amount equal to a second precise predetermined distance to facilitate precision positioning of the locator member 5 relative to the scale 7.

In the preferred embodiment the spacing of the apertures 31 in the scale 7 is 0.4990 inches and the spacing of the slots 21 in the rear portion 17 of the locator member is 0.5 inches. Precision positioning of the locator member 5 can be incrementally adjusted in the preferred embodiment in increments equal to the difference in the spacing of the slots 21 in the locator member 5 and the spacing of the apertures 31 in scale 7 which is equal to (0.5–0.4990) inches or 0.0010 inches. Thus, in the preferred embodiment, precision positioning of the locator member 5 relative to the locator member 7 is effected by incremental movements of 1/1000-th of an inch each either to the left or to the right of base 1.

In the preferred embodiment apertures 31 in the scale are double numbered sequentially from 0–63 to facilitate precision positioning of the locator member 5 relative to the scale 7 in a left or right motion equal to the number of the aperture selected in the set of apertures in the scale 31 times the predetermined increment (0.001 inches in the preferred embodiment).

Ruler 73 as shown in FIG. 1 is affixed to scale 7 for facilitating the positioning of the movable stop 9 relative to the locator member 5 and to the workpiece. Extension member 51, as shown in FIG. 8, is removably attachable to an end of the locator member 5 for extending the length thereof. Extension member 51 comprises a set of spaced-apart slots 21 therein identical to the slots 21 in locator member 5.

Means of compressive force 100 as shown in FIGS. 1 and 2 secures the selected position of the movable stop 9 relative to locator member 5. The compressive force can be any available means such as a clamp.

In the preferred embodiment, movable stop 9, locator member 5, base 1, and scale 7 are constructed of 6061-T6 extruded aluminum with SANFORD hard coating. This material is lightweight yet extremely hard and durable enabling the precision drilling of the apertures and providing for highly accurate long time usefulness.

A person skilled in the art will readily appreciate that the workpiece positioning device of the present invention can achieve extremely accurate precision, repeatable incremental accuracy, with fast positioning capabilities and does not require a user to have years of experience or a high level of expertise to use. The accuracy of the device of the present invention does not depend greatly on the eyesight of the user.

The method of using the workpiece positioning device of the preferred embodiment of the present invention is as follows:

Movable stop 9 is positioned to the nearest ½ inch of the desired position by aligning scribe 61 on the movable stop 9 with the proper ½ inch mark on ruler 73 relative to locator member 5 and the power tool by referencing ruler 73. Movable stop 9 is then shifted incrementally $\frac{1}{16}$-th of an inch either left or right to the within $\frac{1}{16}$-th of an inch of the final position by choosing the proper aperture in the movable stop 9 of the set of apertures 41. The set of apertures 41 in the movable stop 9 are numbered 0–7 designating the number of incremental shifts of $\frac{1}{16}$-th inch each the movable stop is to be shifted, either left or right with respect to the locator member 5, to be positioned within $\frac{1}{16}$-th of an inch of the final position of the movable stop 9 relative to the tool. Pin 43 is inserted through the selected numbered aperture of the set of apertures 41 in the movable stop 9 and into the aligned slot 21 of the set of slots 21 in the locator member 5. Next the desired exact location of the movable stop is obtained by inserting the pin 43 in the selected numbered aperture of the set of apertures 31 in the scale 7 and by moving locator member 5 to align the selected aperture 31 in scale 7 with the underlying slot 21 in the set of slots 21 in the locator member 5. By inserting pin 43 into the aligned aperture 31 and slot 21, the position of the locator member 5 is fixed relative to the scale 7 and the base 1, thereby fixing the position of the movable stop relative to the tool. The final $\frac{1}{16}$-th inch of the position of the movable stop is incrementally divided into $63\frac{1}{1000}$-th of an inch increments each designated by one of the numbered apertures of the set of apertures 31 in scale 7. Apertures 31 in scale 7 are double numbered incrementally starting from both the left and right to facilitate fast placement of pin 43 in scale 7 whether the precision positioning of the locator member relative to the base is either left or right thereof.

It will be readily apparent to those skilled in the art that many modifications to the preferred embodiment of the present invention are possible without deviating from the scope and spirit of the present invention. For instance it will be readily understood by those skilled in the art upon reading and understanding this specification and drawings that the present invention can be used with in a wide variety of applications spanning many industries. Also understood is that the workpiece positioning device of the present invention can be adapted for use with any unit of measurement and tolerances for the incremental positioning of a workpiece relative to a reference point or tool.

The applicant has suggested that some of the many uses of the workpiece positioning device of the present invention are applications involving chop saws, table saws, drill machines and quality control machines among others. One skilled in the art will acknowledge that there are many other applications wherein the present invention can be used as a positioning device.

Thus, while the present invention has been described with preferred embodiments thereof, it will be understood that many modifications will be readily apparent to those skilled in the art. Therefore, it is intended that this invention be limited only by the claims and the equivalents thereof.

What is claimed is:

1. A workpiece positioning device for precisely positioning a workpiece to be worked upon by a power tool comprising:

a stationary base, an elongated locator member carried by the base for limited slideable movement right and left thereof, said locator member having a set of spaced-apart circumferential slots therein, an elongated scale made fast to the base and disposed adjacent to said locator member, a set of axially aligned spaced-apart through-apertures in said scale equal in number to the number of said circumferential slots in said locator member and equal in diameter to the width of said circumferential slots in the locator member, a movable stop having a surface thereon for abutting against a workpiece, said movable stop being disposed adjacent to the locator member for limited slideable movement right and left thereof, said movable stop having a set of axially aligned spaced-apart through-apertures therein, said movable stop being incrementally positionable relative to the locator member by alignment of one of the apertures therein with one of the slots in said locator member, the spacing of the apertures in the movable stop and the spacing of the circumferential slots in the locator member being different from each other by an amount equal to a first precise predetermined distance to facilitate fine positioning of the movable stop relative to the locator member, the locator member being incrementally positionable relative to the scale by alignment of one of the apertures in the scale with one of the circumferential slots in the locator member, the spacing of the apertures in the scale and the spacing of the slots in the locator member being different from each other by an amount equal to a second precise predetermined distance to facilitate precision positioning of the locator member relative to the scale, the second precise predetermined distance being more precise than the first precise predetermined distance, and whereby a workpiece abutting the movable stop will be exactly located in the precise position selected therefor.

2. A workpiece positioning device for precisely positioning a workpiece to be worked on by a power tool comprising:

a stationary base having a cavity therein, an elongated locator member disposed in said cavity for limited slideable movement right and left of said base, said locator member having a set of spaced-apart circumferential slots therein, an elongated scale made fast to the base and disposed said locator member, a set of axially aligned spaced-apart through-apertures in said scale equal in number to the number of said circumferential slots in said locator member and equal in diameter to the width of said circumferential slots in the locator member, a movable stop having a surface thereon for abutting against a workpiece, said movable stop having a cavity therein adjacent to said locator member, a portion of said locator member being disposed in said cavity for limited slideable movement of said movable stop right and left of said locator member, a set of axially aligned spaced-apart horizontal through-apertures in said movable stop, said movable stop being incrementally positionable relative to the locator member by alignment of one of the apertures therein with one of the slots in said locator member, a pin means extendable through the movable stop and into one of the apertures in the front portion of the locator member for fixing whichever position of the movable stop is selected, the spacing of the apertures in the movable stop and the slots in the locator member being different from each other by an amount equal to a first precise predetermined distance to facilitate fine positioning of the movable stop relative to the locator member, said locator member being incrementally positionable relative to the scale by alignment of one of the apertures in said scale with one of the slots in said locator member, whereby a workpiece abutting the movable stop will be exactly located in the precise position desired therefor.

3. A workpiece positioning device as claimed in claim 2 wherein the fine positioning of the movable stop relative to the locator member is effected by incremental movements of $1/16$th of an inch each.

4. A workpiece positioning device as claimed in claim 2 wherein the precision positioning of the locator member relative to the scale is effected by incremental movements of $1/1000$th of an inch each.

5. A workpiece positioning device as claimed in claim 2 wherein the fine positioning of the movable stop relative to the locator member is effected by incremental movements of $1/16$th of an inch each, wherein the precision positioning of the locator member relative to the scale is affected by incremental movements of $1/1000$th of an inch each.

6. A workpiece positioning device as claimed in claim 2 further comprising a ruler affixed to the scale for facilitating the positioning of the movable stop relative to the locator member.

7. A workpiece positioning device as claimed in claim 2 further comprising a pivotable flip stop postionable adjacent to said movable stop for abutting against a workpiece.

8. A workpiece positioning device as claimed in claim 2 further comprising removably attachable means associated with said movable stop and extending laterally the surface thereof which abuts the workpiece.

9. A workpiece positioning device as claimed in claim 2 further comprising an extension member removably attachable to an end of said locator member for extending the length of said locator member, said extension member having a set of spaced-apart circumferential slots therein identical to the set of circumferential slots in said locator member.

10. A workpiece positioning device as claimed in claim 2 wherein the apertures in said movable stop are sequentially numbered to facilitate fine positioning thereof relative to the locator member.

11. A workpiece positioning device as claimed in claim 2 wherein the apertures in said scale are sequentially numbered to facilitate precise positioning of the locator member relative thereto.

12. A workpiece positioning device as claimed in claim 2 wherein said scale is integral to said base.

13. A workpiece positioning device as claimed in claim 1 wherein said pin means is a rotatable alignment pin comprised of a cylindrical insertion area, possessing a raised cubic surface, protruding from the insertion face of the rotatable alignment pin.

14. A workpiece positioning device as claimed in claim 1 wherein upon insertion of the rotatable alignment pin into an individual slot of the locator member, rotation of the rotatable alignment indexes the locator member.

15. A workpiece positioning device as claimed in claim 1 wherein the locator member is indexed $1/64$ of an inch each quarter rotation of the rotatable alignment mechanism.

* * * * *